2,809,078

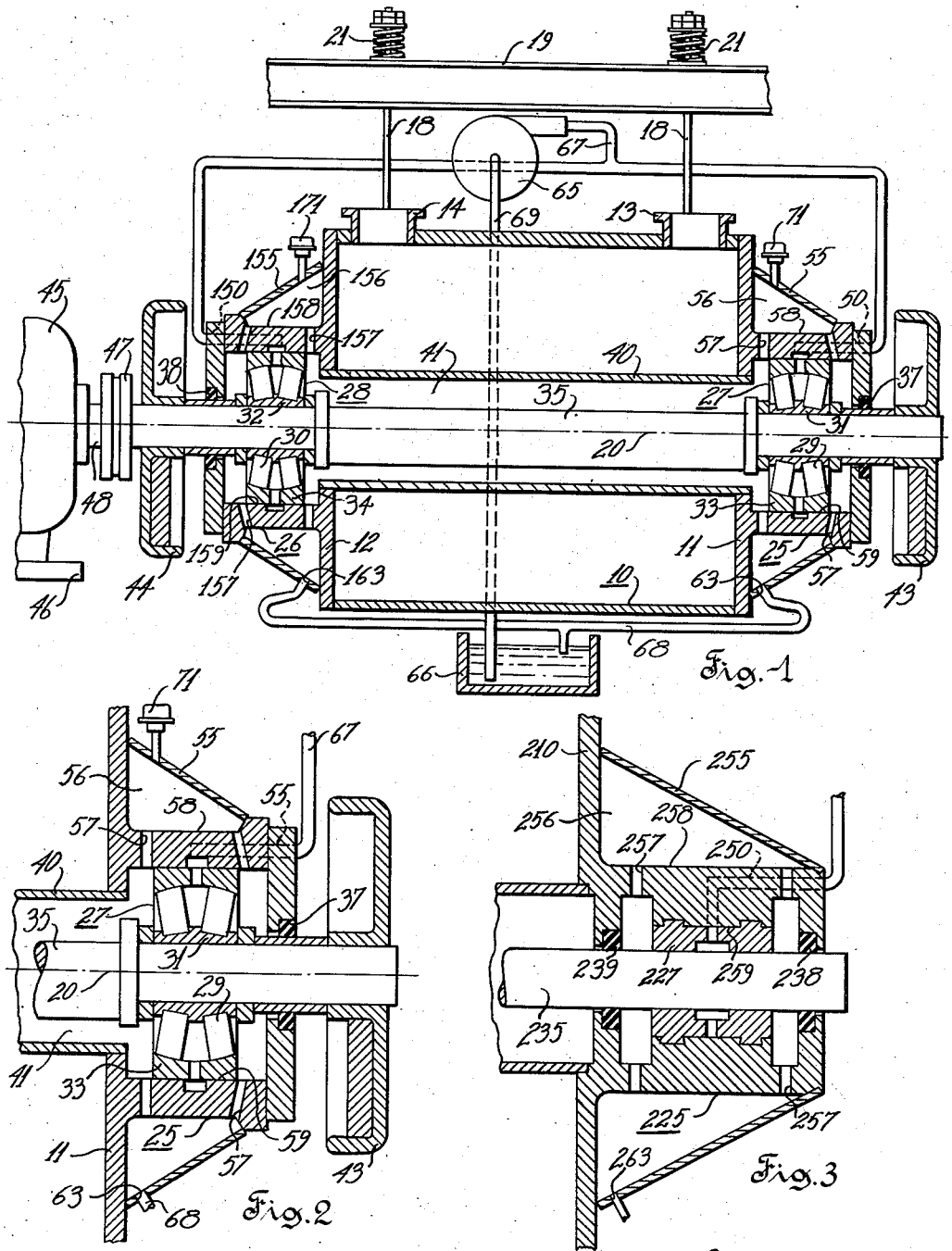

BEARING ASSEMBLY OPERABLE WITH SMALL TEMPERATURE DIFFERENTIAL BETWEEN BEARING AND BEARING HOUSING

Walter J. Hartwig, Milwaukee, Wis., assignor to Allis-Chalmers Manufacturing Company, Milwaukee, Wis.

Application March 7, 1955, Serial No. 492,505

1 Claim. (Cl. 308—76)

The present invention pertains to bearing assemblies and particularly to the providing of means which permit relatively small clearances to be utilized between the parts of a bearing assembly.

In a bearing assembly it is necessary that there be a clearance between the bearing and the shaft or journal that turns in the bearing and, also, a clearance between the bearing and its housing. It is considered very desirable that the clearances in a bearing assembly be as small as practicable and it is to this end that the present invention is directed.

In practice, there is a serious obstacle to providing small clearances between a bearing and its shaft and between the bearing and its housing. After the operation of a machine is started, a bearing and shaft installed in the machine become warm and expand radially. In prior art bearing assemblies the housing in which the bearing is mounted does not become heated as rapidly or to the same extent as the bearing, however. Although the internal surface (inside diameter) of a bearing housing may become heated nearly as rapidly and nearly to the same extent as the bearing, because it is adjacent the bearing, this is not true with regard to the external surface (outside diameter) of the bearing housing. Not only does it require time for heat to be transmitted to the external surface of the bearing housing, there is also the condition that the external surface of the bearing housing normally is exposed to a surrounding atmosphere having a relatively lower temperature. The external surface of the bearing housing loses heat to this surrounding atmosphere, instead of retaining it, and the temperature of the external surface of the bearing housing does not increase as rapidly or to the same extent as the temperature of the bearing. The bearing housing therefore does not expand as rapidly or to the same extent as the bearing.

Consequently, a relatively large clearance between the bearing and its housing must therefore be provided so that binding does not occur between these elements. If a relatively large clearance is not provided between the bearing and its housing, the bearing will be prevented from expanding radially and, as a result, the shaft will also be prevented from expanding radially. In that case it is necessary to provide a relatively large clearance between the shaft and the bearing so that binding does not occur between these elements. One disadvantage which results when binding occurs between a bearing and a shaft is that over-heating occurs, which causes even more intensive binding between these elements, and "freezing" or other damage to the bearing and shaft is likely to result.

A main object of the invention is to provide a new and improved bearing assembly in which relatively small clearances may be utilized between the parts of the bearing assembly.

Another object of the present invention is to provide a bearing assembly in which the bearing housing is caused to expand nearly as rapidly and nearly to the same extent as the bearing after operation of the machine, in which the bearing assembly is installed, is started.

In general, the manner in which the objects of the invention are accomplished is by providing a bearing assembly in which the lubricant supplied to the bearing is caused to flow over the external surface of the bearing housing before being drained from the machine in which the bearing assembly is installed. This heating of the external surface of the bearing housing, and the fact that the internal surface of the bearing housing is heated by virtue of being in contact with the bearing mounted therein, causes only a small temperature differential to be maintained between the bearing and bearing housing so that the bearing housing expands nearly as rapidly and nearly to the same extent as the bearing. Accordingly, the clearance between the bearing housing and bearing may be relatively small and, as the bearing housing will not interfere with the expansion of the bearing, the clearance between the bearing and the shaft journaled therein may be relatively small.

Other objects and advantages will appear from a detailed description of the invention, two embodiments of which are described below and illustrated in the accompanying drawing.

In the drawing:

Fig. 1 is a sectional elevation of a vibrating ball mill embodying a bearing assembly constructed in accordance with the present invention;

Fig. 2 is an enlarged, fragmentary sectional view showing the right hand bearing assembly of the mill illustrated in Fig. 1; and Fig. 3 is a fragmentary sectional view of a modified bearing assembly constructed in accordance with the present invention.

The invention is applicable to any type of machine having a rotatable shaft journaled in one or more bearings of the machine.

Referring to Figs. 1 and 2 of the drawing, there is shown, by way of illustration, a vibrating ball mill equipped with a bearing arrangement which represents one embodiment of the invention. A suitably shaped frame is provided depending on the kind of machine in which the invention is embodied. In this instance the frame is illustrated as a cylindrically shaped container 10 having end walls 11 and 12. A feed inlet 13 and a discharge outlet 14 are provided through which material to be treated is fed to and discharged from the mill.

A machine in which the invention is utilized may have a vibratable frame or a stationary frame and the frame of the embodiment of the invention illustrated in Figs. 1 and 2, which is container 10, is resiliently mounted so that a vibratory movement may be imparted to it. Container 10 is suspended by four cables 18 from a stationary overhead supporting structure 19 with the longitudinal axis 20 of container 10 in a horizontal plane. Resilient means such as springs 21 are provided between cables 18 and supporting structure 19 to allow container 10 to have a vibrational movement in any direction relative to supporting structure 19.

End walls 11 and 12 are provided with bearing housings 25 and 26, illustrated as being generally cylindrical in shape, which are mounted coaxially relative to the longitudinal axis 20 of container 10. Bearings 27 and 28, which are illustrated herein as roller bearings respectively having rollers 29 and 30, inner races 31 and 32, and outer races 33 and 34, are mounted in bearing housings 25 and 26. Rotatably journaled in bearings 27 and 28 is a shaft 35 with the axis thereof being coaxial with the longitudinal axis 20 of the container 10.

Suitable sealing means 37 and 38 are provided, respectively, between the ends of shaft 35 and bearing housings 25 and 26. A tube member 40 surrounds shaft 35 and is operatively connected to bearing housings 25 and 26 so that an annular chamber 41, surrounding shaft 35, extends between and communicates with the interiors of bearing housings 25 and 26.

Eccentrically weighted flywheels 43 and 44 are attached at opposite ends of shaft 35 and each of the flywheels, as well as shaft 35, has a center of gravity disposed eccentrically of the axis of rotation of shaft 35 and the longitudinal axis 20 of container 10. Upon rotating shaft 35, centrifugal forces are transmitted through bearings 25 and 26 so as to cause container 10 to vibrate. A motor 45, mounted on a stationary support 46, is provided for driving shaft 35 of the vibrating ball mill. As the container 10 of the mill is vibratable relative to motor 45, a flexible coupling 47 is provided between shaft 48 of the motor and shaft 35 of the mill.

The construction provided to facilitate lubrication of bearing 27 is the same as for bearing 28. Corresponding elements associated with bearing 28 have reference numerals increased by 100 but not all of such elements will be described or referred to separately.

Conduit means are provided through which a lubricant can be supplied to bearing 27 from an external source and such means are illustrated herein by a conduit 50 formed in bearing housing 25 and the outer race 33 of bearing 27.

Shaft 35 and bearing 27, which in this instance includes rollers 29 and inner and outer races 31 and 33, become heated during operation of the machine and expand in a radially outward direction. In order to minimize the clearance required between the outside diameter of outer race 33 of bearing 27 and the inside diameter of bearing housing 25, means are provided which cause bearing housing 25 to expand nearly as rapidly and nearly to the same extent as bearing 27. To accomplish this a jacket 55 is provided which surrounds bearing housing 25 to form a chamber 56, which may be annular, surrounding bearing housing 25. Conduit means are provided through which a lubricant can be conveyed from bearing 27 to chamber 56 and such conduit means are illustrated as radially extending holes 57 in bearing housing 25.

When the frame of the machine, in this instance the container 10, is caused to vibrate during operation of the machine, centrifugal force acting on the lubricant in the bearing 27 causes the lubricant to flow from the bearing 27, through the holes 57 in bearing housing 25, into chamber 56. The lubricant flowing into chamber 56, having become warmed during the time it was in contact with bearing 27, heats the external surface 58 of bearing housing 25. As heat also is transmitted from bearing 27 to the internal surface 59 of bearing housing 25, bearing housing 25 expands at nearly the same rate and to nearly the same extent as bearing 27. Consequently, with this construction there is little loss of clearance between bearing 27 and bearing housing 25, and between shaft 35 and bearing 27, during the time and after bearing 27 "warms up" to its normal operating temperature.

A portion of the lubricant supplied to bearings 27 and 28 may enter chamber 41, between tube 40 and shaft 35, but this does not adversely affect or interfere with the supplying of lubricant from the bearings to chambers 56 and 156.

Conduit means are provided through which lubricant is drained from chamber 56 and the conduit means are illustrated by a hole 63 formed in the lower part of jacket 55. In operation the warmed lubricant from bearing 27 flows over the external surface 58 of bearing housing 25 and then drains out of chamber 56 through the hole 63 in the lower part of jacket 55.

Means for continuously delivering a supply of lubricant to bearings 27 and 28 and for continuously withdrawing lubricant from chambers 56 and 156 are illustrated, schematically, as comprising a pump 65 and a sump 66. A supply pipe 67 is provided between pump 65 and bearings 27 and 28, a return pipe 68 is provided between sump 66 and chambers 56 and 156, and a pump inlet pipe 69 is provided between sump 66 and pump 65.

Air breather pipes 71 and 171 are connected to jackets 55 and 155 to place the chambers 56 and 156 in communication with the atmosphere.

If the amplitude and/or speed of vibration imparted to the frame of the machine, which in the embodiment shown in Figs. 1 and 2 is container 10, are not sufficient to generate enough centrifugal force to cause the required amount of lubricant to flow from bearing 27 to chamber 56, a modified embodiment of the invention may be utilized. This modification is also applicable to a machine in which the frame to which the bearing and bearing housing are attached is stationary as shown in Fig. 3.

In Fig. 3 there is illustrated the bearing and bearing housing of a fragmentary section of a machine having a stationary frame 210. Frame 210 need not necessarily be the main frame of the machine in which the bearing assembly is installed but could be, for example, a pedestal mounted on a foundation or a bracket arrangement of the type used for line shafts.

Frame 210 is provided with a bearing housing 225, illustrated as being generally cylindrical in shape, and a sleeve type bearing 227 is mounted in the bearing housing 225. Rotatably journaled in bearing 227 is a shaft 235, only a portion of which is shown. Suitable sealing means 238 and 239 are provided between shaft 235 and bearing housing 225 at opposite ends of bearing 227.

Conduit means are provided through which a lubricant can be supplied to bearing 227 from an external source and such means are illustrated herein by a conduit 250 formed in bearing housing 225 and in bearing 227.

Shaft 235 and bearing 227 become heated during operation of the machine and expand in a radially outward direction. In order to minimize the clearance required between the outside diameter of bearing 227 and the inside diameter of bearing housing 225, means are provided which cause bearing housing 225 to expand nearly as rapidly and nearly to the same extent as bearing 227. To accomplish this a jacket 255 is provided which surrounds bearing housing 225 to form a chamber 256, which may be annular, surrounding bearing housing 225. Conduit means are provided through which a lubricant can be conveyed from bearing 227 to chamber 256 and such conduit means are illustrated as radially extending holes 257 in bearing housing 225.

In the embodiment of the invention shown in Figs. 1 and 2, a centrifugal force acting on the lubricant in bearing 27, which causes the lubricant to flow into chamber 56, is attributable to the spinning of shaft 35 and the vibratory motion imparted to frame (container 10) of the machine. In the embodiment shown in Fig. 3, the frame 210 is stationary and, as the spinning of shaft 235 will not alone cause lubricant to flow from bearing 227 to chamber 256, other means for causing the lubricant to flow into chamber 256 are provided. This is accomplished by supplying an adequate amount of lubricant to bearing 227, through inlet conduit 250 in bearing housing 225, to flood the interior of bearing housing 227 and chamber 256. The conduit means through which lubricant is drained from chamber 256, illustrated by a hole 263 in the lower part of jacket 255, is more restrictive than inlet conduit 250 so that flooding of the interior of bearing housing 225 and chamber 256 results when a sufficient amount of lubricant is supplied to bearing 227.

In the operation of the embodiment shown in Fig. 3, warmed lubricant from bearing 227 flows into chamber 256 and heats the external surface 258 of bearing housing 225. As heat also is transmitted from bearing 227 to the internal surface 259 of bearing housing 225, bearing housing 225 expands nearly as rapidly and to nearly the same extent as bearing 227. With this construction there is very little loss of clearance between bearing 227 and bearing housing 225, and between shaft 235 and bearing 227, during the time and after bearing 227 "warms up" to its normal operating temperature.

Means for continuously delivering a supply of lubricant to bearing 227 and for continuously withdrawing lubricant from chamber 256 may be the same as provided for the embodiment of the invention shown in Figs. 1 and 2.

While two specific embodiments of the invention have been described for the purpose of illustration, it is to be understood that the invention is not restricted to the exact details shown and described since various modifications within the scope of the claim may occur to persons skilled in the art to which the invention pertains.

It is claimed and desired to secure by Letters Patent:

In combination, a stationary frame member having a bearing housing, a bearing mounted in said bearing housing, a rotatable shaft supported in said bearing, inlet conduit means for delivering a lubricant to said bearing where said lubricant is warmed when said shaft rotates, a jacket surrounding said bearing housing and cooperating therewith to form a chamber surrounding said bearing housing, conduit means extending through said housing for conveying the warmed lubricant from said bearing through said housing and to said chamber to warm the interior and the external surface of the bearing housing to increase the rate and extent of radial expansion of said bearing housing, and means for continuously draining the lubricant from said chamber which comprises conduit means having a more restrictive opening than said inlet conduit means so that a continuous flow of warmed lubricant from said bearing floods said chamber during operation.

References Cited in the file of this patent

UNITED STATES PATENTS 2,443,403　　Smith ------------------ June 15, 1948